(12) United States Patent
Yoshida et al.

(10) Patent No.: US 6,603,726 B1
(45) Date of Patent: Aug. 5, 2003

(54) PRE-PIT DETECTION UNIT

(75) Inventors: Masayoshi Yoshida, Saitama (JP); Yoshitaka Shimoda, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/557,308

(22) Filed: Apr. 25, 2000

(30) Foreign Application Priority Data

Apr. 26, 1999 (JP) .......................................... 11-118286

(51) Int. Cl.⁷ ................................................. G11B 7/00
(52) U.S. Cl. ............................ 369/124.01; 369/124.07; 369/47.27
(58) Field of Search ........................ 369/124.07, 275.1, 369/44.41, 44.29, 47.27, 275.4, 44.13, 47.28, 44.23, 59.1, 124.01

(56) References Cited

U.S. PATENT DOCUMENTS

| | | | | |
|---|---|---|---|---|
| 4,975,895 A | * | 12/1990 | Yanagi | .................... 369/44.29 |
| 4,980,877 A | * | 12/1990 | Sugiyama et al. | ....... 369/44.41 |
| 5,943,313 A | * | 8/1999 | Ando et al. | ............... 369/275.1 |
| 6,188,654 B1 | * | 2/2001 | Kaku et al. | ............ 369/124.07 |

* cited by examiner

Primary Examiner—William Korzuch
Assistant Examiner—Kim-Kwok Chu
(74) Attorney, Agent, or Firm—Sughrue Mion, PLLC

(57) ABSTRACT

A pre-pit detection unit having pre-pit detection circuits (600 and 700) respectively corresponding to beam intensity in mark and space periods that are provided in parallel on the output side of a push-pull circuit (500) for generating a pre-data signal. The pre-pit detection unit finally outputs the OR of the outputs of both pre-pit detection circuits as a pre-pit detection signal (l). An AGC circuit (601 and 701) for making the maximum amplitude of a radial push-pull signal (d) obtainable from said push-pull circuit coincide with a reference value is provided in the preceding stages of pre-pit detecting comparators (606 and 706) in the respective pre-pit detection circuits.

18 Claims, 14 Drawing Sheets

BLOCK DIAGRAM SHOWING THE WHOLE CONFIGURATION OF PRE-PIT DETECTION UNIT ACCORDING TO THE INVENTION

EXAMPLE OF DVD-R WITH PRE-PIT FORMED ON LAND TRACK

EXAMPLE OF RECORDING FORMAT IN DVD-R ACCORDING TO EMBODIMENT OF THE INVENTION

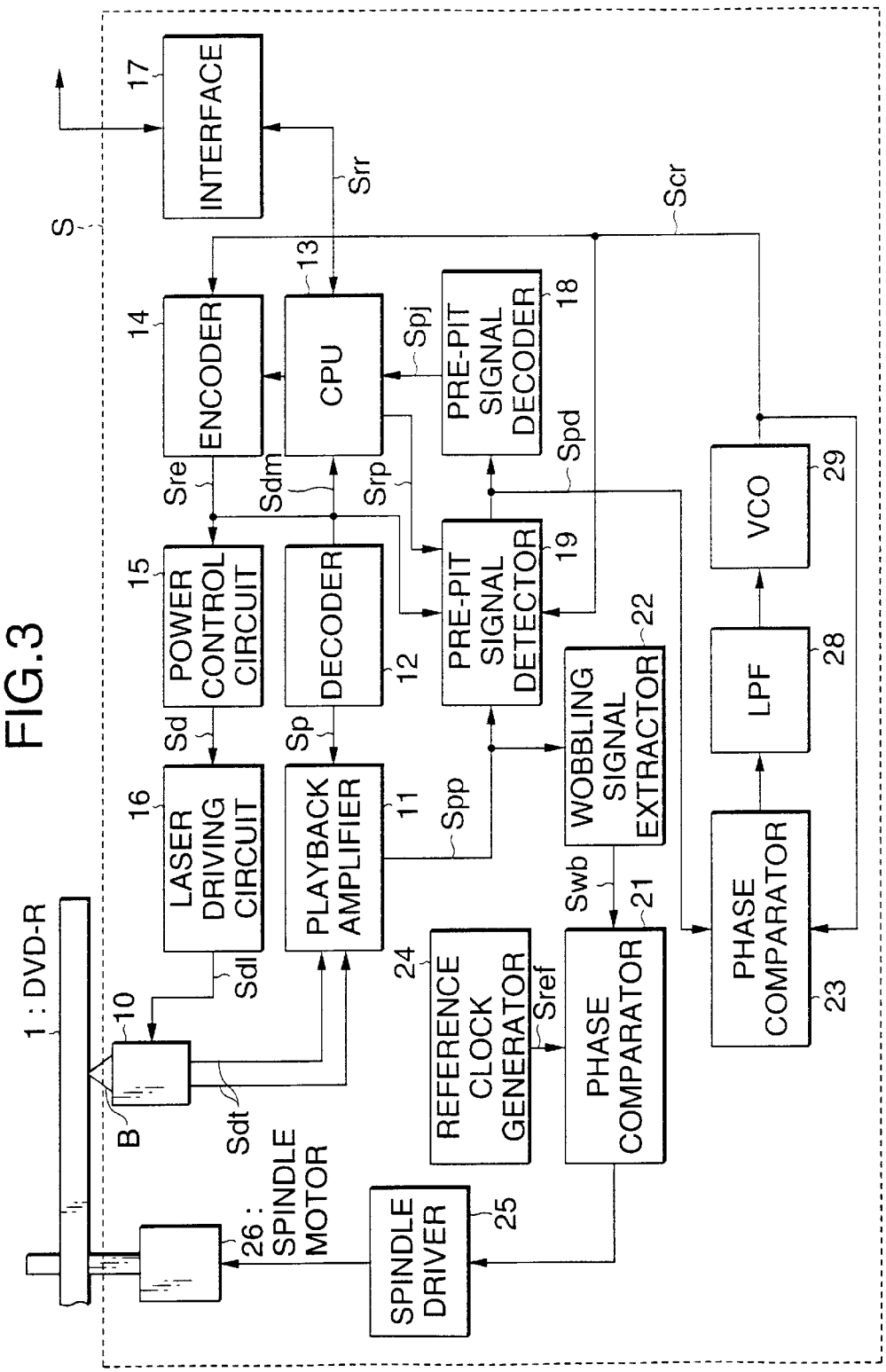
FIG.3 SCHEMATIC BLOCK DIAGRAM SHOWING ARRANGEMENT OF DATA RECORDING APPARATUS

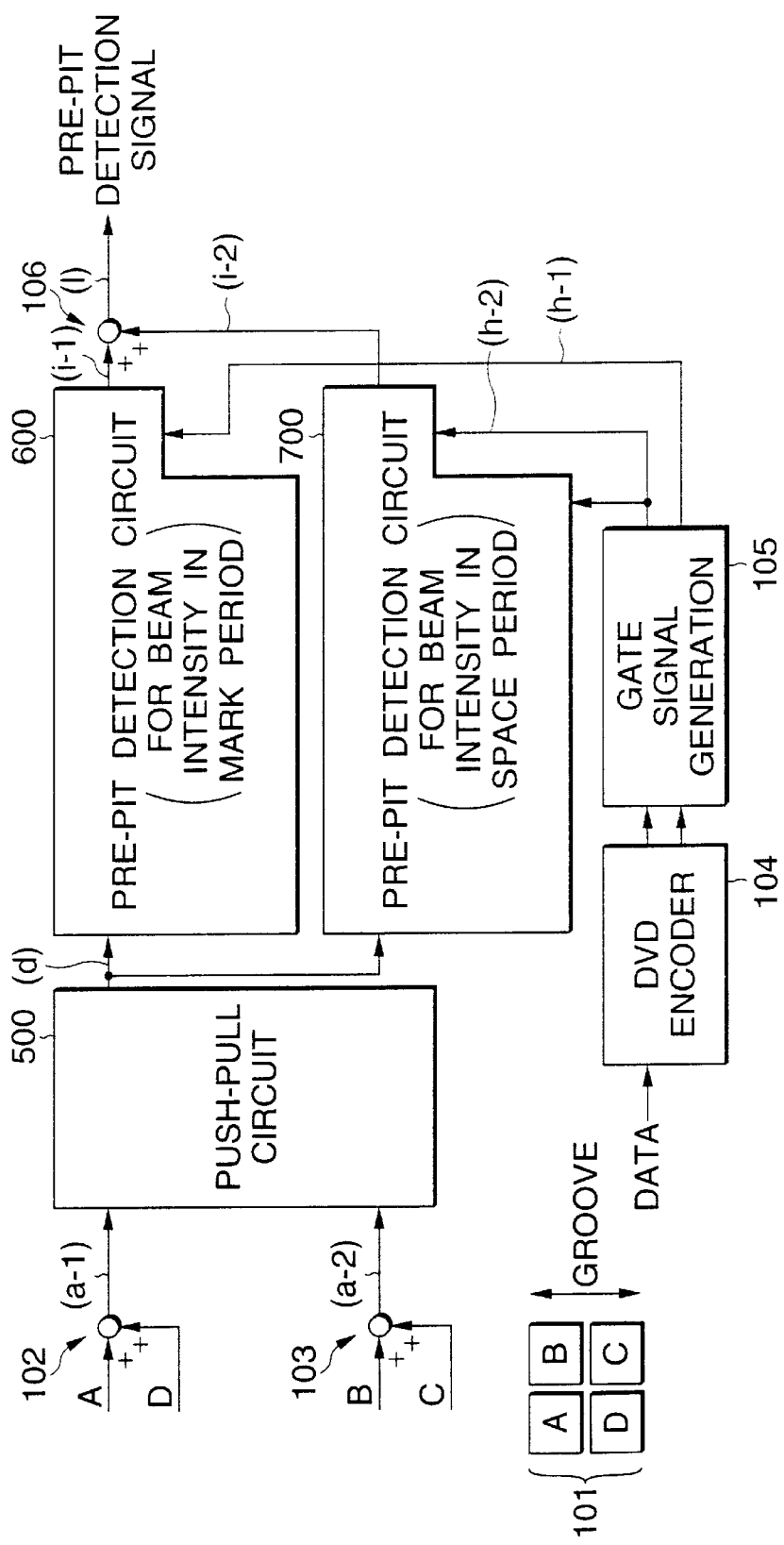

BLOCK DIAGRAM SHOWING INTERNAL
CONFIGURATION OF PUSH-PULL CIRCUIT IN
THE APPARATUS ACCORDING TO THE INVENTION

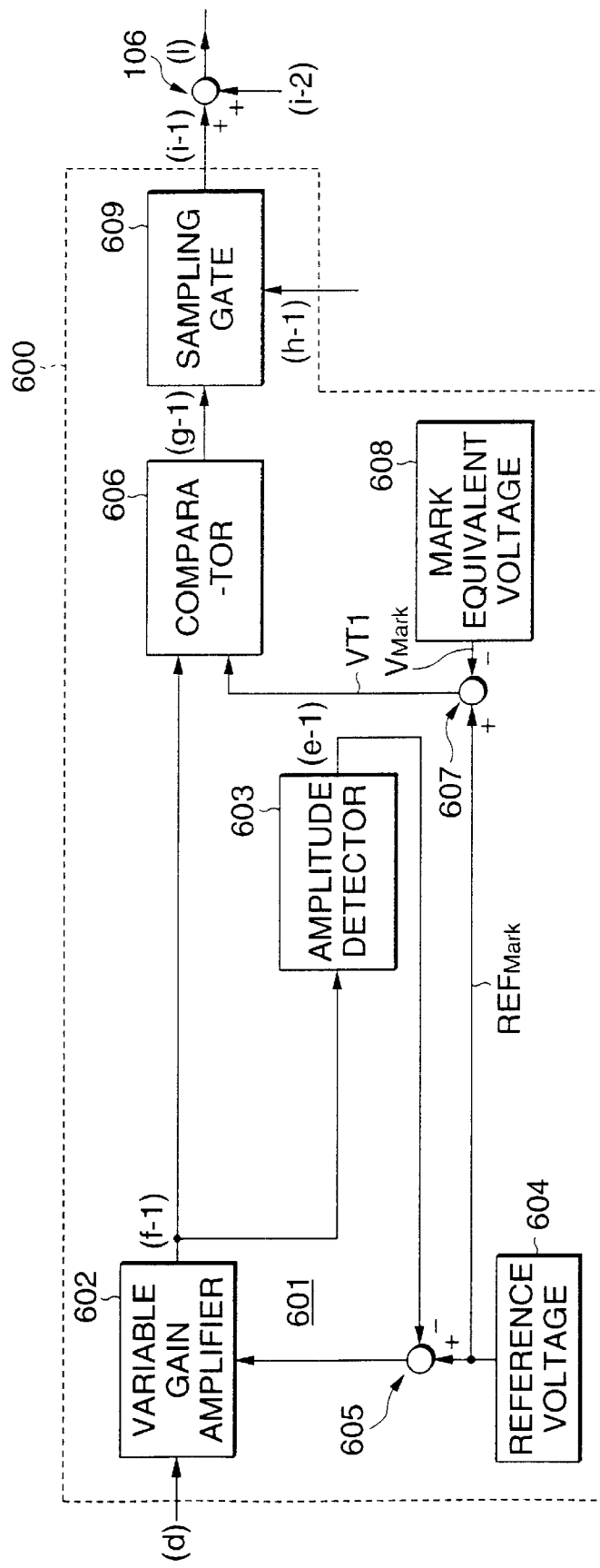
FIG.6 BLOCK DIAGRAM SHOWING INTERNAL CONFIGURATION OF PRE-PIT DETECTION CIRCUIT FOR BEAM INTENSITY IN MARK PERIOD IN THE APPARATUS ACCORDING TO THE INVENTION BLOCK DIAGRAM SHOWING INTERNAL CONFIGURATION OF PRE-PIT DETECTION CIRCUIT FOR BEAM INTENSITY IN SPACE PERIOD IN THE APPARATUS ACCORDING TO THE INVENTION

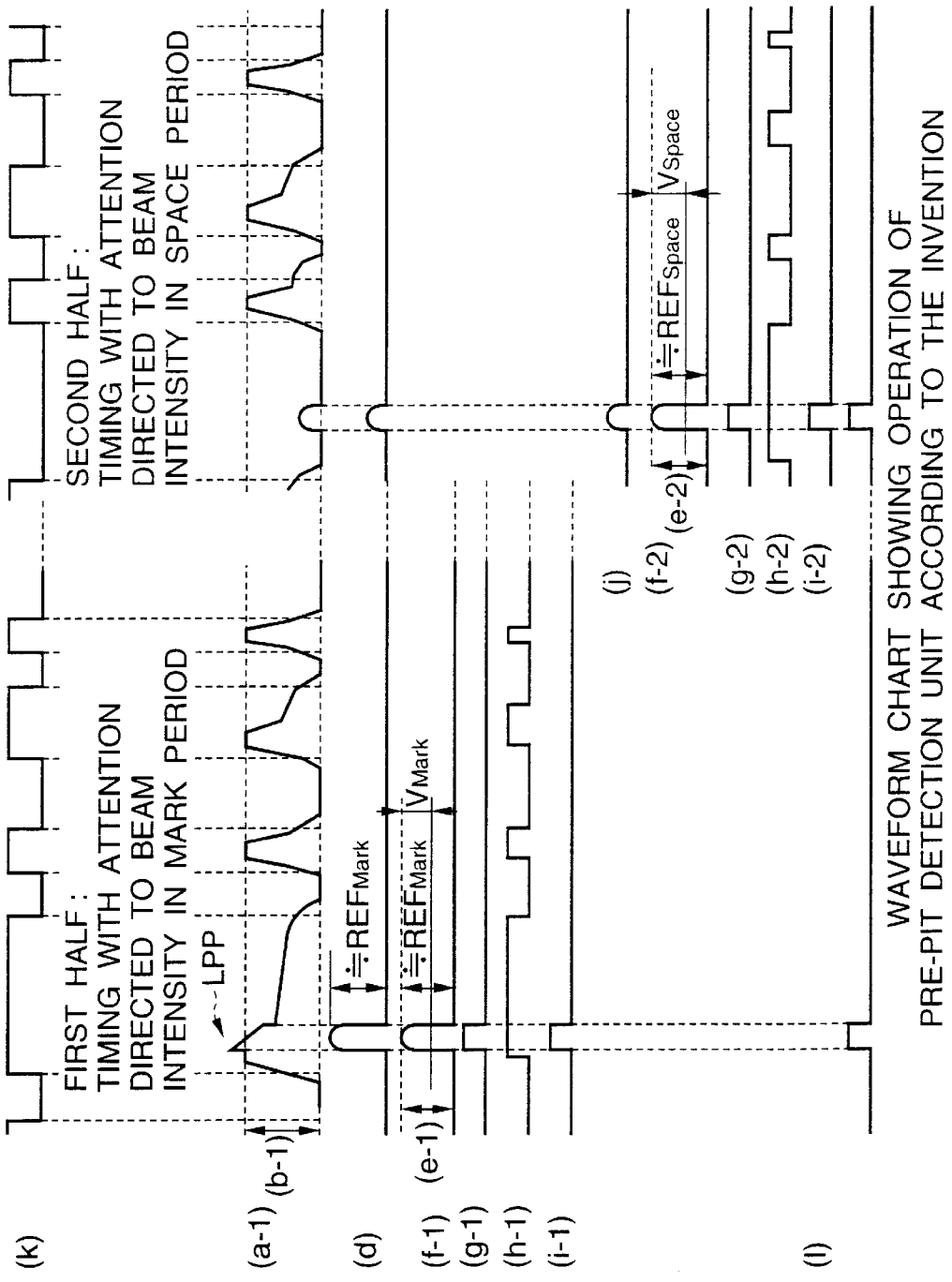

INTERNAL CIRCUIT CONFIGURATION OF
AMPLITUDE DETECTORS 603 AND 703

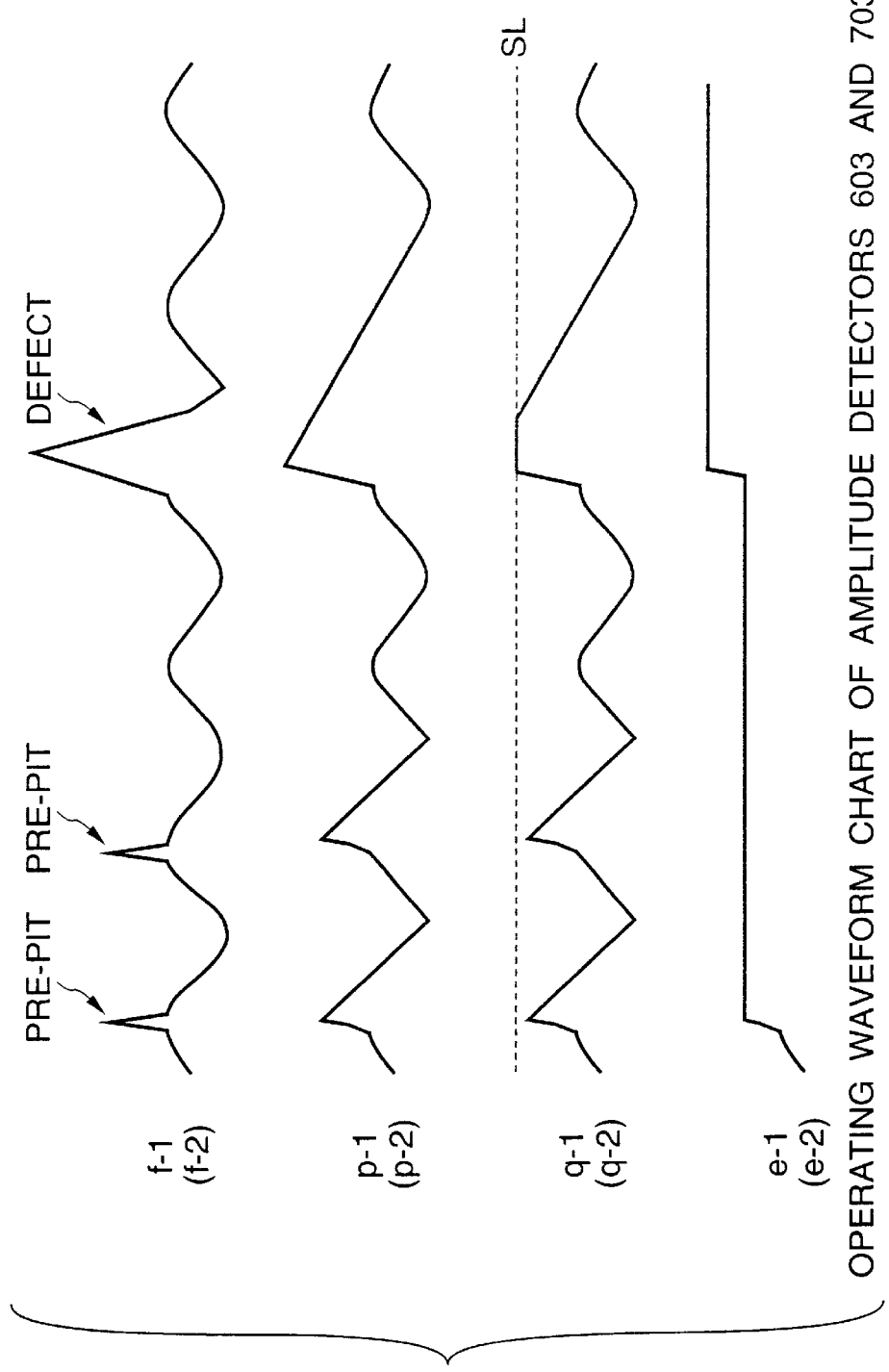

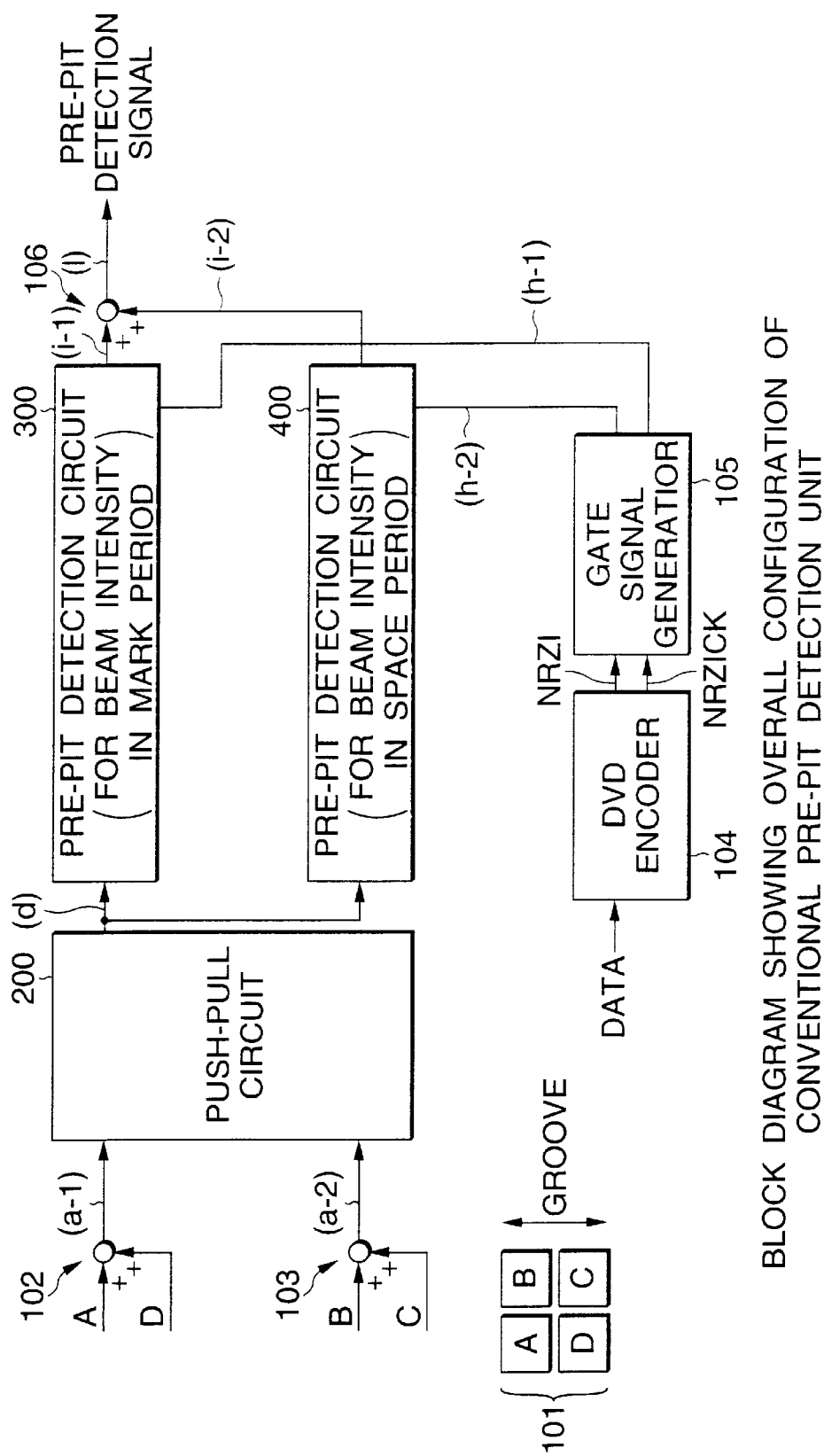

INTERNAL CONFIGURATION OF PUSH-PULL
CIRCUIT IN CONVENTIONAL UNIT

BLOCK DIAGRAM SHOWING INTERNAL CONFIGURATION OF PRE-PIT DETECTION CIRCUIT FOR BEAM INTENSITY IN MARK AND SPACE PERIODS IN CONVENTIONAL UNIT

PRE-PIT DETECTION UNIT

BACKGROUND OF THE INVENTION

This invention relates to pre-pit detection units fit for use in recording-playback apparatus intended for high-density recording media such as DVD-R and DVD-RW and more particularly to a pre-pit detection unit ensuring that pre-pits can be detected even though the amplitude level of a radial push-pull signal fluctuates.

As disclosed in the Examined Japanese Patent Application No. Hei 10-283638, for example, a recording—playback apparatus intended for high-density recording media such as DVD-R and DVD-RW has a self-contained pre-pit detection unit ensuring that pre-pits on a recording medium can be detected even though beam intensity is in the state of either mark or space period.

FIGS. 11 to 13 show a specific example of such a pre-pit detection unit as mentioned above; and FIG. 14, an operating waveform chart. As shown in FIG. 11, the basic arrangement of the pre-pit detection unit is such that a pre-pit detection circuit 300 corresponding to the beam intensity in the mark period and a pre-pit detection circuit 400 corresponding to the beam intensity during the space period are provided in parallel on the output side of a push-pull circuit 200 for generating a pre-data signal and that the OR of the outputs of both pre-pit detection circuits 300 and 400 is finally outputted as a pre-pit detection signal (l).

In FIG. 11, reference numeral 101 denotes a quadrified detector (light receiving element) for outputting a four-system light receiving signal comprising A to D areas; 102, an adder (e.g. an adder using an OP amplifier) for generating a light receiving signal (a-1) in the left-hand area with respect to the push-pull circuit 200 by adding the A-area light receiving signal and the D-area light receiving signal of the quadrified detector 101; 103, an adder for generating a light receiving signal (a-2) in the right-hand area with respect to the push-pull circuit 200 by adding the B-area light receiving signal and the C-area light receiving signal of the quadrified detector 101; 104, a DVD encoder for encoding recording data by utilizing digital modulation technology; 105, a gate signal generator 105 for generating gate signal (h-1 and h-2) according to NRZI and NRZICK signals obtainable from the DVD encoder 104; and 106, an OR operator 106 for obtaining the OR of the outputs (i-1 and i-2) of both the pre-pit detection circuits 300 and 400.

FIG. 12 shows the internal structure of the push-pull circuit 200. As shown in FIG. 12, the push-pull circuit 200 includes a substractor (e.g., an adder using an OP amplifier) 201 for generating a radial push-pull signal (d) as a pre-data signal by subtracting the light receiving signal (a-1) in the left-hand area and the light receiving signal (a-2) in the right-hand area.

FIG. 13 shows the internal structure of the pre-pit detection circuits 300 and 400. As shown in FIG. 13, the pre-pit detection circuit 300 corresponding to the beam intensity in the mark period includes a (fixed gain) amplifier 301 for amplifying the radial push-pull signal (d) outputted from the push-pull circuit 200 by means of a constant gain, a comparator 303 for detecting pre-pits by comparing the output signal (f-1) of the amplifier 301 with a mark equivalent voltage (VMARK) as a threshold voltage (VT1), and a sampling gate 304 that is opened and closed under the control of the gate signal (h-1) so as to pass the output signal (g-1) of the comparator 303 therethrough. Similarly, the pre-pit detection circuit 400 corresponding to the beam intensity in the space period includes a (fixed gain) amplifier 401 for amplifying the radial push-pull signal (d) outputted from the push-pull circuit 200 by means of a constant gain, a comparator 403 for detecting pre-pits by comparing the output signal (f-2) of the amplifier 401 with a mark equivalent voltage (VSPACE) as a threshold voltage (VT2), and a sampling gate 404 that is opened and closed under the control of the gate signal (h-2) so as to pass the output signal (g-2) of the comparator 403 therethrough.

In the above case, a so-called floating binarization system is employed for the comparing operation in the comparators 303 and 403. Consequently, the mark equivalent voltage (VMARK) and the space equivalent voltage (VSPACE) are generated by shifting the level of the radial push-pull signal (d) by a low component.

In such a recording-playback apparatus as mentioned above, the balance of the quantity of light that is incident on the light receiving element and reflected from the disk collapses because of variations in the environment of use that cause optical axis fluctuations to a laser oscillator and because the presence of optical aberration in the pickup as well as the presence of internal-external aberration in the reflectance of the disk. In consequence, the amplitude level of the radial push-pull signal (d) may fluctuate (may cause disturbance).

When the situation above arises in the prior art pre-pit detection unit, the output signals (f-1 and f-2) of the respective amplifiers 301 and 401 are directly susceptible to the influence of fluctuations in the amplitude level of the radial push-pull signal (d). On the other hand, values of the mark equivalent voltage (VMARK) and space equivalent voltage (VSPACE) as the threshold voltages VT1 and VT2 of the comparators 303 and 403 disposed at the following stage of the respective amplifiers 301 and 401 are generated by level-shifting the low component of the radial push-pull signal (d) by a predetermined value, the fluctuations of the radial push-pull signal (d) with respect to the maximum amplitude lever will have to be dull.

When the amplitude level of the radial push-pull signal (d) sharply fluctuates as shown in the waveform chart of FIG. 14, the output signal (f-1) of the amplifier 301 consequently follows the fluctuation and fluctuates, whereupon an abnormal pulse whose pulse width and phase are not normal or a pre-pit pulse that should not be present (error detection) will appear in a pre-pit detection signal (l) resulting from gating of the output signal (g-1) of the comparator 303 with the sampling gate 304; the problem is that address retrieval and spindle control may be impeded by the mistaken recognition of pre-format data.

SUMMARY OF THE INVENTION

An object of the present invention with special attention directed to the foregoing problems in the prior art pre-pit detection unit is to provide a pre-pit detection unit capable of detecting a pre-pit accurately even though the amplitude level of a radial push-pull signal fluctuates.

In order to accomplish the object above, a pre-pit detection unit according to the invention comprises a push-pull circuit for generating a radial push-pull signal including a pre-data signal according to each of lateral outputs of a light receiving element, a first pre-pit detection circuit for beam intensity in a mark period for detecting a pre-pit corresponding to the beam intensity in the mark period according to the radial push-pull signal obtained from the push-pull circuit, and a second pre-pit detection circuit for beam intensity in a space period for detecting a pre-pit corresponding to the beam intensity in the space period according to the radial push-pull signal obtained from the push-pull circuit, so that the OR of outputs of both pre-pit detection circuits is outputted as a pre-pit detection signal, and is characterized in that a first and a second AGC circuit for making the maximum amplitude of the radial push-pull signal obtainable from the push-pull circuit coincide with a reference value are provided in the preceding stages of pre-pit detecting comparators in the first and the second pre-pit detection circuits respectively.

The pre-pit detection circuit for the beam intensity in the mark period and the pre-pit detection circuit for the beam intensity in the space period may be provided in parallel on the output side of the push-pull circuit for generating the pre-data signal.

With this arrangement, since the comparison input level of the pre-pit detecting comparator is maintained within the reference value even though the amplitude level of the radial push-pull signal fluctuates, an abnormal pulse whose pulse width and phase are not normal or a pre-pit pulse that should not be present (error detection) is prevented from appearing in the pre-pit detection signal, which results in preventing address retrieval and spindle control from being impeded by the mistaken recognition of pre-format data as long as the threshold value as a comparison standard for the pre-pit detecting comparator is properly set.

The threshold value of the pre-pit detecting comparator is preferably set according to a reference value that the maximum amplitude of the push-pull signal should coincide with.

With this arrangement, it is therefore possible to keep constant the maximum amplitude level of the radial push-pull signal and also to improve pre-pit detection accuracy accordingly as a constant level difference is always maintained between the maximum amplitude of the push-pull signal and the comparing threshold value.

The AGC circuits for making the maximum amplitude of the signal obtained from the light receiving element coincide with the reference value is preferably provided in each input system of a differential operator forming the push-pull circuit for generating the pre-data signal.

With this arrangement, it is therefore possible to restrain any abnormal radial push-pull signal from being outputted from the push-pull circuit itself as much as possible, whereupon pre-pit detection accuracy is also improvable further.

The first and the second AGC circuits include a variable gain amplifier for adjusting the amplitude of the radial push-pull signal, an amplitude detector for detecting the amplitude of the output signal of the variable gain amplifier, and a differential operator circuit for generating a gain control signal for controlling the gain of the variable gain amplifier according to the output value of the amplitude detector and a predetermined reference value, and the amplitude detector preferably includes a first peak hold circuit which is positioned at the preceding stage and has a small time constant, and a second peak hold circuit which is positioned at the following stage and has a large time constant.

This arrangement ensures that a sharp variable component equivalent to the pre-pit is caught and properly held over pre-pit appearance intervals.

An amplitude limiting circuit is preferably placed between the first and second peak hold circuits.

With this arrangement, the possibility of mistaking any defect on the disk for a pre-pit becomes reducible.

Further, in order to accomplish the objective above, a pre-pit detection method comprises the steps of: generating a radial push-pull signal including a pre-data signal according to each of lateral outputs of a light receiving element by a push-pull circuit, detecting a pre-pit corresponding to beam intensity in a mark period according to the radial push-pull signal obtained from the push-pull circuit by a first pre-pit detection circuit for the beam intensity in the mark period for, and detecting a pre-pit corresponding to a beam intensity in a space period according to the radial push-pull signal obtained from the push-pull circuit by a second pre-pit detection circuit for the beam intensity in the space period, so that the OR of outputs of both pre-pit detection circuits is outputted as a pre-pit detection signal, and making the maximum amplitude of the radial push-pull signal obtainable from the push-pull circuit coincide with a reference value by a first and a second AGC circuits provided in the preceding stages of pre-pit detecting comparators in the first and the second pre-pit detection circuits respectively.

The pre-pit detection circuit for the beam intensity in the mark period and the pre-pit detection circuit for the beam intensity in the space period may be provided in parallel on the output side of the push-pull circuit for generating the pre-data signal.

With this method, since the comparison input level of the pre-pit detecting comparator is maintained within the reference value even though the amplitude level of the radial push-pull signal fluctuates, an abnormal pulse whose pulse width and phase are not normal or a pre-pit pulse that should not be present (error detection) is prevented from appearing in the pre-pit detection signal, which results in preventing address retrieval and spindle control from being impeded by the mistaken recognition of preformat data as long as the threshold value as a comparison standard for the pre-pit detecting comparator is properly set.

The threshold value of the pre-pit detecting comparator is preferably set according to a reference value that the maximum amplitude of the push-pull signal should coincide with.

With this method, it is therefore possible to keep constant the maximum amplitude level of the radial push-pull signal and also to improve pre-pit detection accuracy accordingly as a constant level difference is always maintained between the maximum amplitude of the push-pull signal and the comparing threshold value.

The AGC circuits for making the maximum amplitude of the signal obtained from the light receiving element coincide with the reference value is preferably provided in each input system of a differential operator forming the push-pull circuit for generating the pre-data signal.

With this method, it is therefore possible to restrain any abnormal radial push-pull signal from being outputted from the push-pull circuit itself as much as possible, whereupon pre-pit detection accuracy is also improvable further.

In the first and the second AGC circuits; adjusting the amplitude of the radial push-pull signal by a variable gain amplifier, detecting the amplitude of the output signal of the variable gain amplifier by an amplitude detector, and generating a gain control signal for controlling the gain of the variable gain amplifier according to the output value of the amplitude detector and a predetermined reference value by a differential operator circuit, wherein the amplitude detector includes; a first peak hold circuit which is positioned at the preceding stage and has a small time constant, and a second peak hold circuit which is positioned at the following stage and has a large time constant.

This method ensures that a sharp variable component equivalent to the pre-pit is caught and properly held over pre-pit appearance intervals.

An amplitude limiting circuit is preferably placed between the first and second peak hold circuits.

With this method, the possibility of mistaking any defect on the disk for a pre-pit becomes reducible.

BRIEF DESCRIPTION OF THE DRAWINGS

FIG. 3 is a schematic block diagram showing an arrangement of a data recording apparatus.

FIG. 4 is a block diagram showing the whole configuration of a pre-pit detection unit according to the invention.

FIG. 6 is a block diagram showing the internal configuration of pre-pit detection circuit for beam intensity in a mark period in the apparatus according to the invention.

FIG. 8 is a waveform chart showing the operation of the pre-pit detection unit according to the invention.

FIG. 10 is an operating waveform chart of the amplitude detectors 603 and 703.

FIG. 11 is a block diagram showing the overall configuration of a conventional pre-pit detection unit.

DETAILED DESCRIPTION OF THE PREFERRED EMBODIMENTS

A detailed description will now be given of a preferred embodiment of the invention with reference to the accompanying drawings (FIGS. 1–10).

(Structure of Recording Medium)

The structure of DVD-R will be described, the DVD-R being operated in a data recording apparatus having a built-in pre-pit detection unit embodying the invention.

Figure 1:
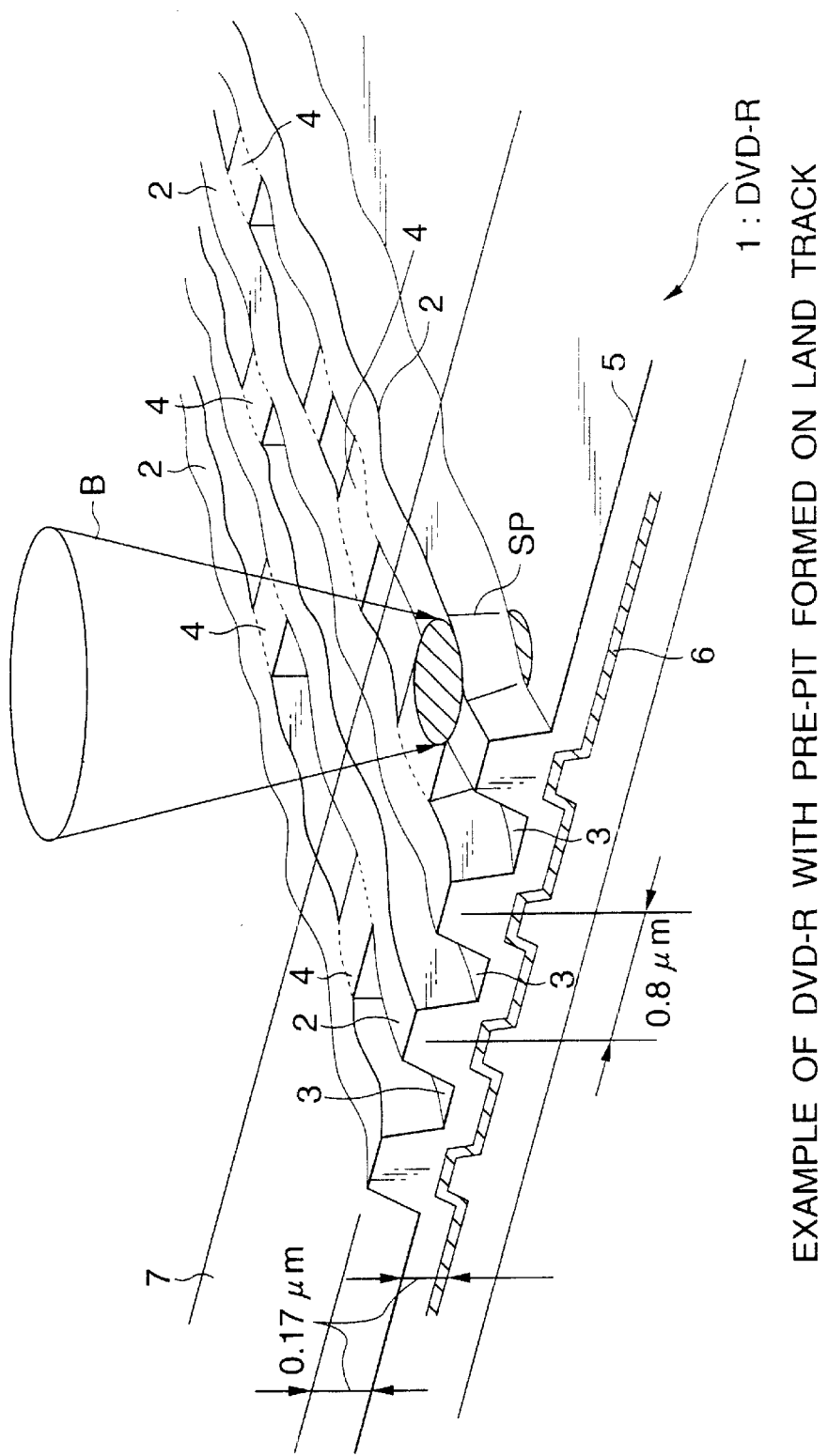
FIG. 1 is a diagram illustrating an example of DVD-R with pre-pits in land tracks.

In FIG. 1, there is shown a pigmented DVD-R 1 having a pigmented film 5 wherein data can be written thereto only once. Further, the DVD-R 1 includes groove tracks 2 as data tracks, land tracks 3 as adjoining tracks for guiding an optical beam B such as a laser beam as playback or recording light to the groove tracks 2, a protective film 7 for protecting these tracks, and a gold deposited surface 6 for reflecting the optical beam B when the recorded data is played back.

Pre-pits 4 corresponding to pre-data have been preformed in the land tracks 3 on the DVD-R 1 before shipment. The groove tracks 2 have been subjected to wobbling at a frequency corresponding to the rated rotational speed of the DVD-R 1. The recording of recording control data by the wobbling of the groove tracks 2 has been pre-performed like the pre-pits 4 before the shipment of the DVD-R 1.

When recording data (defined as data concerning image data to be originally recorded other than the pre-data) is recorded on the DVD-R 1, the frequency of the wobbling of the groove trucks 2 is sampled in a data recording unit which will be described below so as to detect the pre-data by detecting the pre-pits 4 whereby to control the rotation of the DVD-R 1 at a predetermined rotational speed. Simultaneously, an optimum output of the optical beam B as the recording light is set according to the pre-data thus obtained so as to obtain data concerning an address as a position on the DVD-R 1 where the recording data is to be recorded. Then recording data is recorded in the corresponding recording position according to the address data. At the time of recording the recording data, the optical beam B is emitted so that its center may coincide with the center of the groove track 2, whereby recording data pits corresponding to the recording data are formed on the groove track 2. At this time, the size of spot light SP is set, as shown in FIG. 1, large enough to cover not only the groove track 2 but also part of the land track 3.

Through a push-pull method using part of the reflected light of the spot light SP emitted to the land track 3 (a push-pull method using a detector for detecting the light divided by parallel division lines in the direction of rotation of the DVD-R 1 (hereinafter called a radial push-pull system)), the pre-data is detected and obtained from the pre-pits 4. The reflected light of the spot light SP emitted to the groove track 2 is used to detect a wobbling signal as the pre-data from the groove track 2 and also to obtain a clock signal for controlling the rotation.

(Pre-Data Recording Format)

Figure 2:
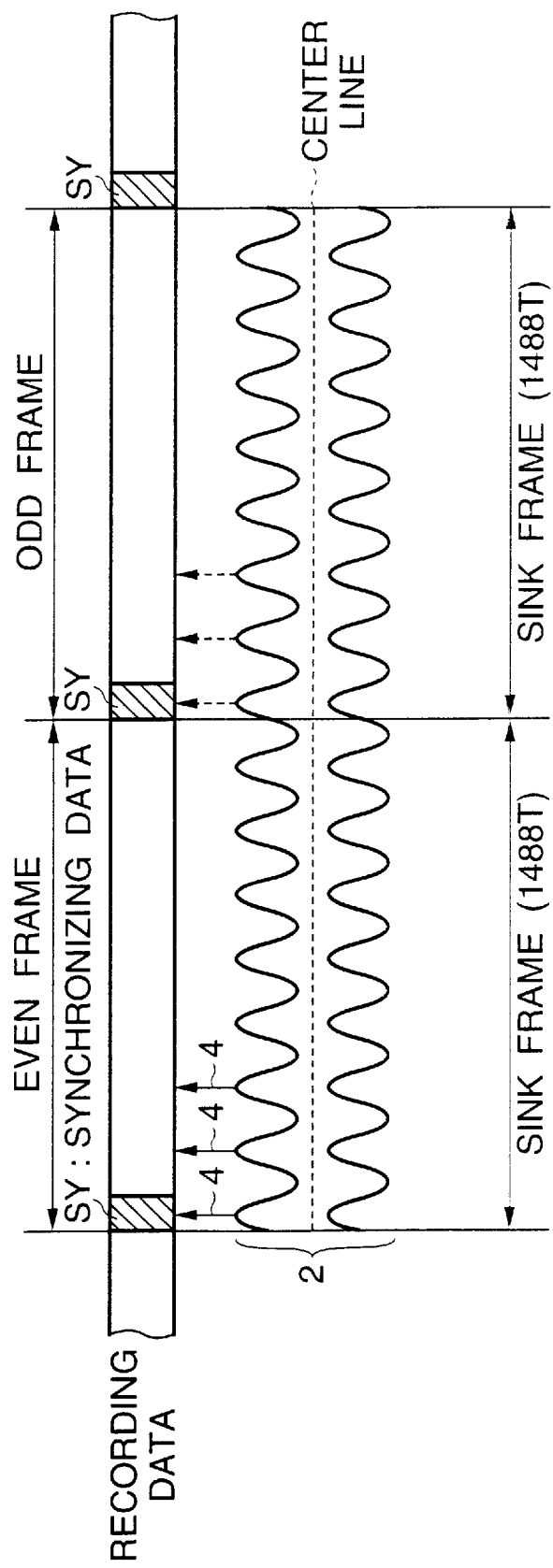
FIG. 2 is a diagram illustrating an example of a recording format in DVD-R.

A recording format with the pre-data prerecorded on the DVD-R 1 will now be described with reference to FIG. 2. In FIG. 2, an upper row shows a recording format in the recording data, and waveforms in a lower row shows the wobbling condition (a plan view of the groove track 2) of the groove track 2 for recording the recording data. Upward arrows between the recording data and the wobbling condition of the groove track 2 exemplarily show positions where the pre-pits 4 are formed. In FIG. 2, moreover, the wobbling condition of the groove track is shown in such a way that its amplitude greater than the actual amplitude is used to facilitate understanding, and the recording data is recorded on the center line of the groove track 2.

As shown in FIG. 2, the recording data recorded on the DVD-R 1 has been pre-divided into data units on a sinc frame basis and 26 sinc frames form one recording sector. Further, 16 recording sectors form one ECC (Error Correcting Code) block. The one sinc frame is 1,488 times (1,488T) as long as an unit length (hereinafter called T) corresponding to the pit-to-pit space defined by a recording format when the recording data is recorded. Further, synchronizing data SY for securing synchronization on a sinc frame basis is recorded in a portion having 14T at the head of one sinc frame.

In this example, the pre-data recording on the DVD-R 1 is recorded in each sinc frame. In recording the pre-data by the pre-pits 4, one pre-pit 4 as what indicates a synchronizing signal in pre-data is always formed on the land track 3 adjoining an area where the synchronizing data SY in each sinc frame forming the recording data is formed. One or two pre-pits 4 showing the contents (address data) of pre-data to be recorded on the land track 3 adjoining the first half portion in the sinc frame other than the synchronizing data SY (incidentally, no pre-pits 4 maybe formed, depending on the contents of pre-data to be recorded, in the first half portion in the sinc frame other than the synchronizing data SY). In this example then, the pre-pits 4 are formed in only the even-numbered sinc frame (hereinafter called EVEN frame) or only the odd-number one (hereinafter called ODD frame) in one recording sector whereby to record the pre-data. In other words, when the pre-pits 4 are formed in the EVEN frame (shown by the solid upward arrows) in FIG. 2, no pre-pits 4 are formed in the adjoining ODD frame.

The groove track 2 has been subjected to wobbling at a constant wobbling frequency of of 140 kHz (one sinc frame has a frequency equivalent to eight waves and its period equivalent to 186T) over the whole sinc frame. In the data recording apparatus as will be described below, a signal for controlling the rotation of a spindle motor is detected by detecting the wobbling signal having the constant wobbling frequency fo.

(Overall Arrangement and Operation of Data Recording Apparatus)

The overall arrangement of the data recording apparatus including the pre-pit detection unit according to the invention will now be described with reference to FIGS. 3 to 6. The following description is intended to describe the recording of the digital data sent from a host computer onto the DVD-R 1.

Referring to FIG. 3 first, there is shown the overall arrangement and operation of the data recording apparatus. In this case, the pre-pits 4 storing the address data on the DVD-R 1 and the wobbling groove tracks 2 have been preformed on the DVD-R 1. When the digital data is recorded, the address data on the DVD-R 1 is obtained by predetecting the pre-pits 4, whereby the recording position where the digital data is recorded on the DVD-R 1 can be detected.

As shown in FIG. 3, the data recording apparatus S comprises a pickup 10, a playback amplifier 11, a decoder 12, CPU 13, an encoder 14, a power control circuit 15, a laser driving circuit 16, a pre-pit signal decoder 18, a pre-pit signal detector (equivalent to the pre-pit detection unit) 19, phase comparators 21 and 23, a wobbling signal extractor 22, a reference clock generator 24, a spindle motor 26, an LPF (Low Pass Filter) 28, and a VCO (Voltage Controlled Oscillator) 29. Digital data Srr to be recorded is fed from external host computer via an interface 17 in the data recording apparatus S.

The overall operation will now be described. The pickup 10 includes a laser diode, a polarizing beam splitter, an objective lens, and an optical detector. Digital data Srr to be recorded is recorded by irradiating the data recording surface of the DVD-R 1 with a light beam B according to a laser driving signal Sdl and detecting the pre-pit 4 and the wobbling signal of the groove track 2 of the radial push-pull system based on the reflected light. In a case where the already recorded digital data exists, the already recorded digital data is detected on the basis of the reflected light of the light beam.

The playback amplifier 11 amplifies a pickup detection signal Sdt including data corresponding to the wobbling signals of the pre-pit 4 and the groove track 2 that are outputted from the pickup 10, and outputs a pre-data signal Spp corresponding to the wobbling signals of the pre-pit 4 and the groove track 2 and simultaneously an amplifying signal Sp corresponding to the digital data already recorded. Then decoder 12 makes the amplifying signal Sp to undergo 8–16 demodulation and deinterleave so as to decode the amplifying signal Sp and sends a demodulating signal Sdm to the CPU 13.

The pre-pit signal detector 19 forms the important part of the invention and as will be described in detail below, sends a pulse signal as a pre-pit detection signal Spd to the pre-pit signal decoder 18 and the phase comparator 23 according the pre-data signal Spp.

The phase comparator 23, the LPF 28 and the VCO 29 constitute a so-called PLL circuit and sends a recording clock signal Scr synchronized with the pre-pit detection signal Spd thus received to the encoder 14 and the pre-pit signal detector 19.

The wobbling signal extractor 22 includes a BPF (Band Pass Filter) for extracting a wobbling signal component from the pre-data signal Spp, a comparator for comparing the wobbling signal component thus extracted with a reference value and outputs a pulse signal for only a period during which the amplifying level of the wobbling signal component becomes greater than the reference value. In other words, the wobbling signal extractor 22 makes the wobbling signal component a pulse train and sends to the phase comparator 21 the pulse train as an extraction wobbling signal Swb.

The phase comparator 21 phase-to-phase compares the extraction wobbling signal Swb received with a reference clock signal Sref including a reference frequency component of the rotational speed of the DVD-R 1 supplied from the reference clock generator 24 and supplies the difference signal to the spindle motor 26 as a rotation control signal via the spindle motor 26. Thus, the spindle motor 26 is placed under spindle servo control, so that the DVD-R 1 rotates at the speed based on the frequency and phase of the reference clock signal Sref.

Under the control of the CPU 13, the interface 17 performs an interface operation for taking the digital data Srr into the data recording apparatus S with respective to the digital data Srr transmitted from the host computer and feeds the digital data Srr passed through the interface process into the encoder 14 via the CPU 13.

Thus, with the recording clock signal Scr from the VCO 29 as a timing signal, the encoder 14 generates a modulation signal Sre by applying an ECC generate process, and an 8–16 modulation and scramble process (not shown) and sends the modulation signal Sre to the power control circuit 15 and the pre-pit signal detector 19.

In order to make the recording pit formed on the DVD-R 1 look better, the power control circuit 15 then performs the waveform conversion (so-called light strategy process) of the modulation signal Sre according the recording clock signal Scr for outputting a recording signal Sd for driving the laser diode (not shown) in the pickup 10.

The laser driving circuit 16 outputs the laser driving signal Sdl for causing the light beam B to be emitted by actually driving the laser diode.

Finally, the CPU 13 acquires the pre-data according to the pre-data decoding signal Spj outputted from the pre-pit signal decoder 18 according to the pre-pit detection signal Spd and controls the operation of recording the digital data Srr in the position on the DVD-R 1 corresponding to the address data included in the pre-data. In parallel to the operation above, the CPU 13 sends out a playback signal corresponding to the digital data already recorded via the interface 17 and simultaneously controls the whole data recording apparatus S.

Further, the CPU 13 generates a state display signal Srp for showing whether the data recording apparatus S is in a recording or playback state and sends the state display signal Srp to the pre-pit signal detector 19.

(Details of Pre-Pit Detection Unit)

FIGS. 4–7 show an example of the specific arrangement of the pre-pit detection unit which functions as the pre-pit signal detector 19; and FIGS. 4–7, a waveform chart thereof. Incidentally, like reference characters in FIGS. 4–7 designate like and corresponding parts in the prior art example with the omission of the description thereof.

As shown in FIG. 4, the pre-pit detection unit includes a pre-pit detection circuit 600 corresponding to beam intensity in a mark period and a pre-pit detection circuit 700 corresponding to beam intensity in a space period on the output side of a push-pull circuit 500 for generating the pre-data, the pre-pit detection circuits 600 and 700 being in parallel to each other. The OR of the outputs (i-1 and i-2) of both the pre-pit detection circuits 600 and 700 is obtained in the OR operator 106 and finally outputted as the pre-pit detection signal (l).

Figure 5A:
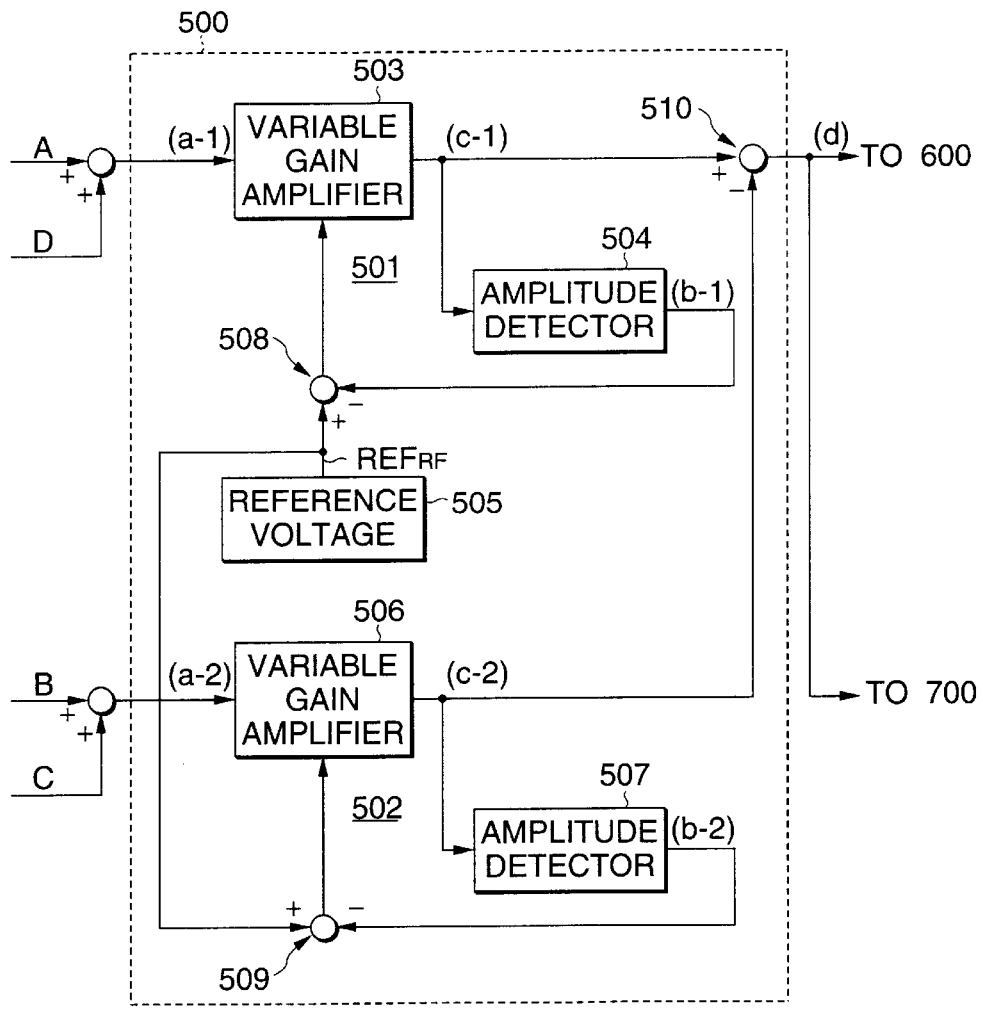
FIGS. 5A and 5B are diagrams showing the internal configuration of a push-pull circuit in the apparatus according to the invention.
Figure 5B:
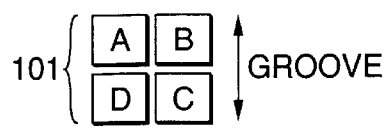

FIGS. 5A and 5B show the internal configuration of a push-pull circuit 500, which has two AGC (Auto Gain Control) circuits including an AGC a left-hand AGC circuit 501 and a right-hand AGC circuit 502. The left-hand AGC circuit 501 functions as what makes the maximum amplitude of the signal obtained from the light receiving signal (a-1) in the left-hand area with a reference value (REF$_{RF}$). Similarly, the right-hand AGC circuit 502 functions as what makes the maximum amplitude of the signal obtained from the light receiving signal (a-2) in the right-hand area with the reference value (REF$_{RF}$).

More specifically, the left-hand AGC circuit 501 has a variable gain amplifier 503 disposed in the route of the light receiving signal (a-1) in the left-hand area, an amplitude detector 504 for detecting the amplitude of the output (c-1) of the variable gain amplifier 503, and a differential operator 508 for obtaining the deviation of the output voltage (b-1) of the amplitude detector 504 from the reference voltage (REF$_{RF}$) 505, whereby the deviation signal obtained from the differential operator 508 is supplied to the gain control input of the variable gain amplifier 503. Thus, the gain of the variable gain amplifier 503 is controlled so that the amplitude of the output signal may coincide with the reference voltage (REF$_{RF}$). Similarly, the right-hand AGC circuit 502 has a variable gain amplifier 506 disposed in the route of the light receiving signal (a-2) in the right-hand area, an amplitude detector 507 for detecting the amplitude of the output (c-2) of the variable gain amplifier 506, and a differential operator 509 for obtaining the deviation of the output voltage (b-2) of the amplitude detector 507 from the reference voltage (REF$_{RF}$) 505, whereby the deviation signal obtained from the differential operator 509 is supplied to the gain control input of the variable gain amplifier 506. Thus, the gain of the variable gain amplifier 506 is controlled so that the amplitude of the output signal may coincide with the reference voltage (REF$_{RF}$).

The output (c-1) of the variable gain amplifier 503 forming the left-hand AGC circuit 501 and the output (c-2) of the variable gain amplifier 506 forming the right-hand AGC circuit 503 are subjected to differential operations in a differential operator 510 and the calculated result is outputted as the push-pull signal (d).

In each input system of the differential operator 510 forming the push-pull circuit 500 for generating the pre-data, there are provided the AGC circuits 501 and 502 for making the maximum amplitude of the left- and right-hand light receiving signals (a-1) and (a-2) obtainable from the quadrified detector 101 as a light receiving element coincide with the (REF$_{RF}$). It is therefore possible to restrain any abnormal radial push-pull signal (d) from being outputted from the push-pull circuit 500 itself as much as possible.

FIG. 6 shows the internal configuration of the pre-pit detection circuit 600 corresponding to beam intensity in the mark period. As shown in FIG. 6, an AGC circuit 601 for making the maximum amplitude of a radial push-pull signal (d) obtainable from the push-pull circuit 500 coincide with a reference value (REF$_{MARK}$) is provided at the preceding stage of a pre-pit detecting comparator 606 in the pre-pit detection circuit 600. The AGC circuit 601 has a variable gain amplifier 602 disposed in the signal route of the radial push-pull signal (d), an amplitude detector 603 for detecting the amplitude of the output (f-1) of the variable gain amplifier 602, and a differential operator 605 for obtaining the deviation of the output voltage (e-1) of the amplitude detector 603 from a reference voltage (REF$_{MARK}$) 604 whereby the deviation signal obtained from the differential operator 605 is supplied to the gain control input of the variable gain amplifier 602. Thus, the gain of the variable gain amplifier 602 is controlled so that the amplitude of the output signal (f-1) may always coincide with the reference voltage (REF$_{MARK}$). The comparator 606 in the pre-pit detection circuit 600 detects pre-pits by comparing the amplitude of the output signal (f-1) of the variable gain amplifier 602 with a predetermined threshold value VT1 and binarizing the result of comparison. In this case, the threshold value VT1 is generated by subtracting the mark equivalent voltage (V$_{MARK}$) from the reference voltage (REF$_{MARK}$) 604. With this arrangement, it is therefore possible to keep constant the maximum amplitude level of the radial push-pull signal and also to improve pre-pit detection accuracy accordingly as a constant level difference (V$_{MARK}$) is always maintained between the maximum amplitude (f-1) of the push-pull signal and the comparing threshold value (VT1).

The output signal (g-1) of the comparator 606 is caused to undergo gating by a sampling gate 609 that is opened and closed under the control of the gate signal (h-1) before being sent to the OR operator 106 as a mark-side pre-pit detection signal (i-1)

Figure 7:
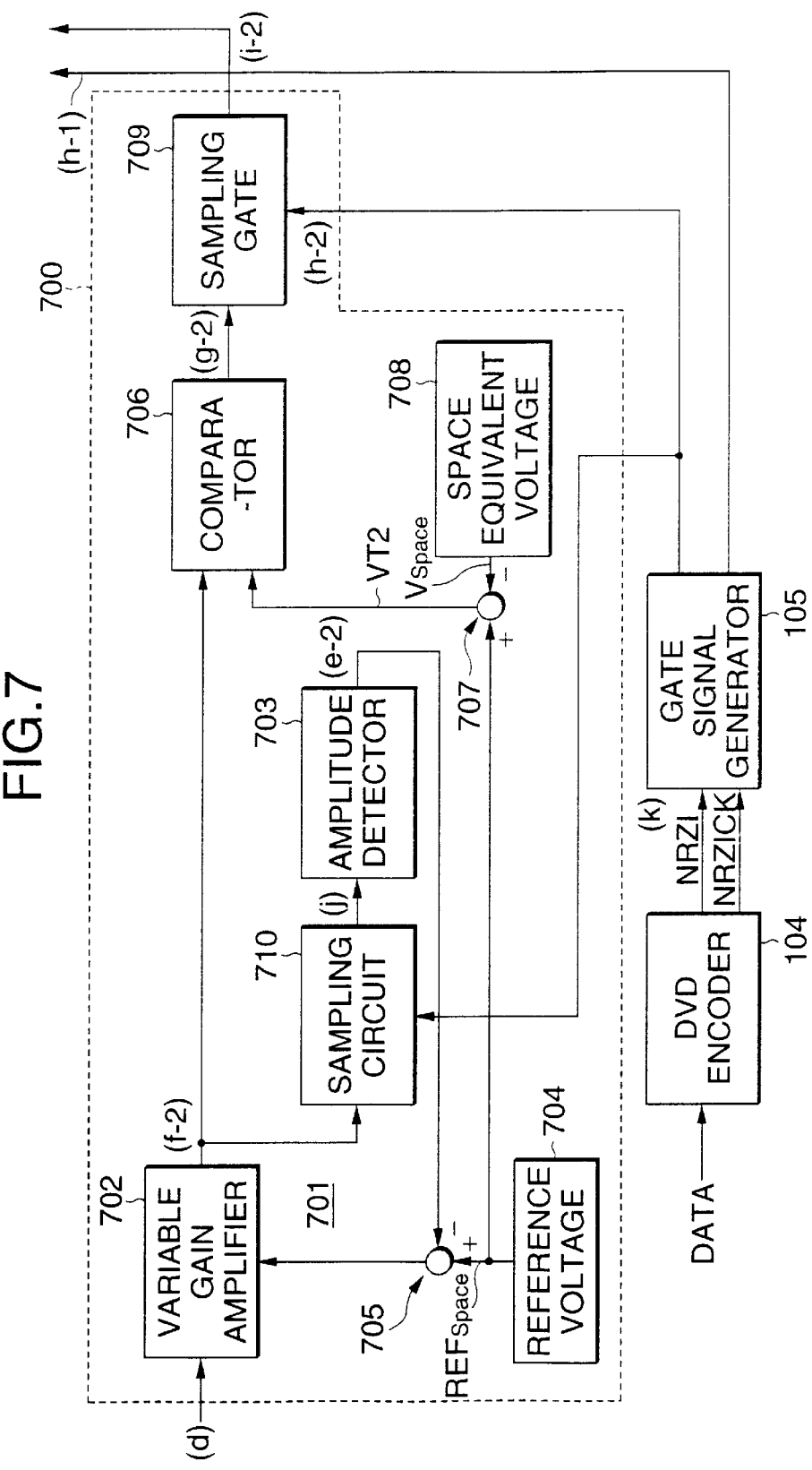
FIG. 7 is a block diagram showing the internal configuration of pre-pit detection circuit for beam intensity in a space period in the apparatus according to the invention.

FIG. 7 shows the internal configuration of the pre-pit detection circuit 700 corresponding to beam intensity in the space period. As shown in FIG. 7, an AGC circuit 701 for making the maximum amplitude of the radial push-pull signal (d) obtainable from the push-pull circuit 500 coincide with a reference value (REF$_{SPACE}$) is provided at the preceding stage of a pre-pit detecting comparator 706 in the pre-pit detection circuit 700. The AGC circuit 701 has a variable gain amplifier 702 disposed in the signal route of the radial push-pull signal (d), an amplitude detector 703 for detecting the amplitude of the output (f-2) of the variable gain amplifier 702, and a differential operator 705 for obtaining the deviation of the output voltage (e-2) of the amplitude detector 703 from a reference voltage (REF$_{SPACE}$) 704 whereby the deviation signal obtained from the differential operator 705 is supplied to the gain control input of the variable gain amplifier 702. Thus, the gain of the variable gain amplifier 702 is controlled so that the maximum amplitude of the output signal (f-2) in the space period may always coincide with the reference voltage (REF$_{SPACE}$).

A sampling circuit 710 in FIG. 7 functions as what selectively extracts the push-pull signal from the variable gain amplifier 702 given during the H-level period of the gate signal (h-2) indicating the space period supplied from the gate signal generator 105. Moreover, the amplitude detector 703 also functions as a so-called peak hold circuit. Therefore, the maximum amplitude value in the space period is detected and held by making the sampling circuit 710 cooperate with the amplitude detector 703. In the pre-pit detection circuit 600, no circuit equivalent to the sampling circuit 710 exists. This is because the maximum amplitude value obtainable in the mark period always becomes greater than the maximum amplitude value obtainable in the space period as the beam intensity in the mark period is always greater than the beam intensity in the space period.

The comparator 706 in the pre-pit detection circuit 700 compares the output signal (f-2) of the variable gain amplifier 702 with a predetermined threshold value VT2 and binarizes the result of comparison whereby to detect pre-pits existing at the time of beam intensity in the space period. At this time, the threshold value VT2 is generated by subtracting the space equivalent voltage (VSPACE) from the reference voltage (REFSPACE) 704. With this arrangement, it is therefore possible to keep constant the maximum amplitude level of the radial push-pull signal and also to improve pre-pit detection accuracy accordingly as a constant level difference (VSPACE) is always maintained between the maximum amplitude (f-2) of the push-pull signal and the comparing threshold value (VT2).

The output signal (g-2) of the comparator 706 is caused to undergo gating by a sampling gate 709 that is opened and closed under the control of the gate signal (h-2) before being sent to the OR operator 106 as a space-side pre-pit detection signal (i-2).

The pre-pit detection signal (i-1) obtained from the pre-pit detection circuit 600 corresponding to beam intensity in the mark period is ORed with the pre-pit detection signal obtained from the pre-pit detection circuit 700 corresponding to beam intensity in the space period in the OR operator 106 and outputted as a final pre-pit detection signal (l).

In the pre-pit detection unit according to this embodiment of the invention, the maximum amplitude of the radial push-pull signal (d) corresponding to beam intensity in the mark period is caused to always coincide with the reference value (REFMARK) and simultaneously the maximum amplitude of the radial push-pull signal (d) corresponding to beam intensity in the space period is caused to always coincide with the reference value (REFSPACE) as shown in the operating waveform chart of FIG. 8. In addition, the pre-pit detection threshold value corresponding to beam intensity in the mark period comes to a value resulting from subtracting the fixed voltage (VMARK) from the reference value (REFMARK) and simultaneously the pre-pit detection threshold value corresponding to beam intensity in the space period comes to a value resulting from subtracting the fixed voltage (VSPACE) from the reference value (REFSPACE). With this arrangement, it is therefore possible to keep constant the maximum amplitude level of the radial push-pull signal and also to improve pre-pit detection accuracy accordingly as a constant level difference is always maintained between the maximum amplitude of the push-pull signal and the comparing threshold value.

Further, in each input system of the differential operator 510 forming the push-pull circuit 500 for generating the pre-data, there are provided the AGC circuits 501 and 502 for making the maximum amplitude of the left- and right-hand light receiving signals (a-1) and (a-2) obtainable from the quadrified detector 101 as a light receiving element coincide with the (REFRF). It is therefore possible to restrain any abnormal radial push-pull signal (d) from being outputted from the push-pull circuit 500 itself as much as possible. As viewed from this aspect, pre-pit detection accuracy is also improvable further.

In the above embodiment of the invention, any known so-called peak hold circuit may be used as an amplitude detector 504, 507, 603 or 703. With respect to the pre-pit detection circuits 600 and 700 contained in the respective amplitude detectors 603 and 703, however, it is preferred to devise the following arrangement.

Figure 9A:
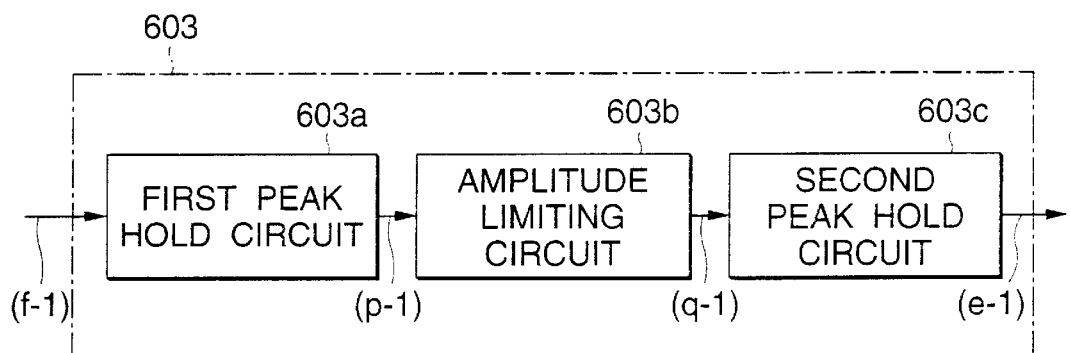
FIGS. 9A and 9B are block diagrams showing the internal circuit configuration of amplitude detectors 603 and 703.
Figure 9B:
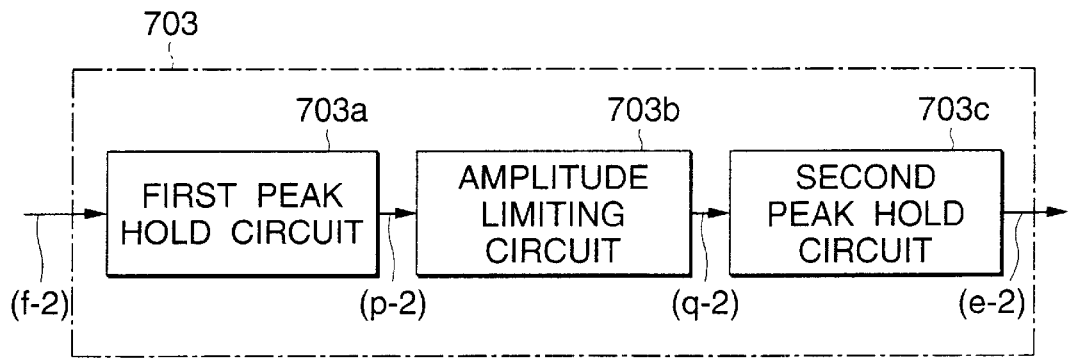
Figure 12:
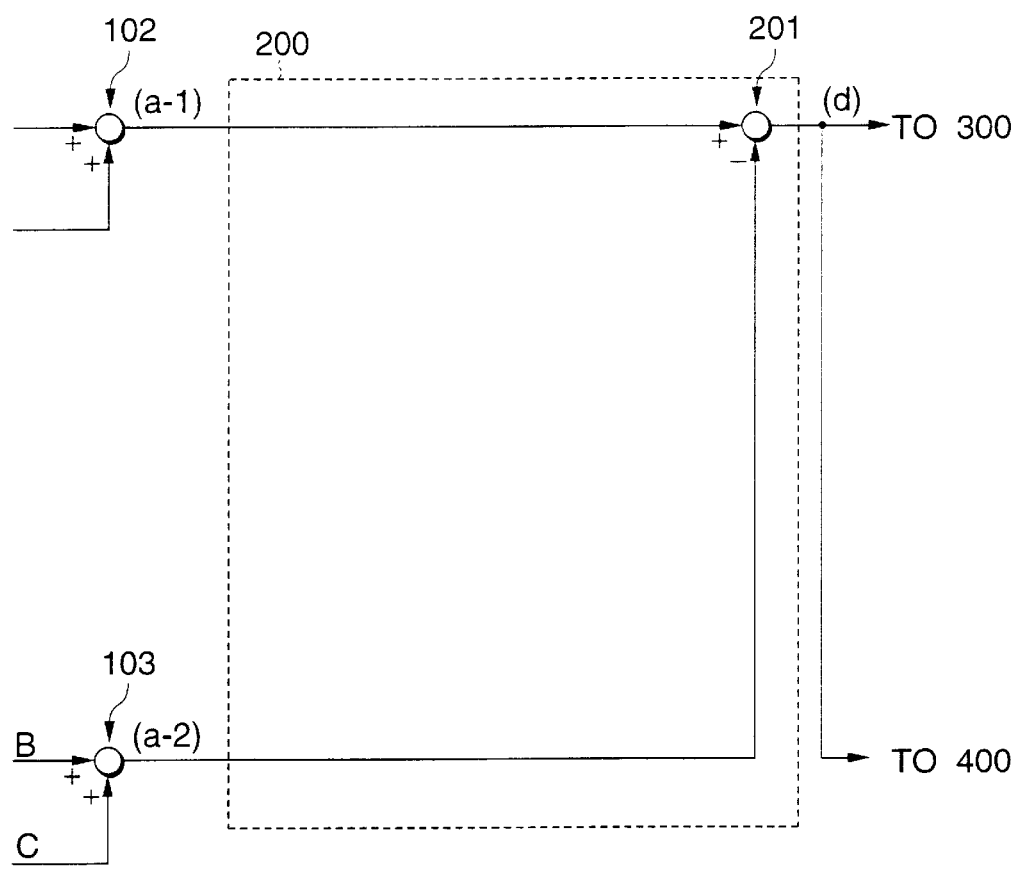
FIG. 12 is a diagram showing the internal configuration of a push-pull circuit in the conventional unit.
Figure 13:
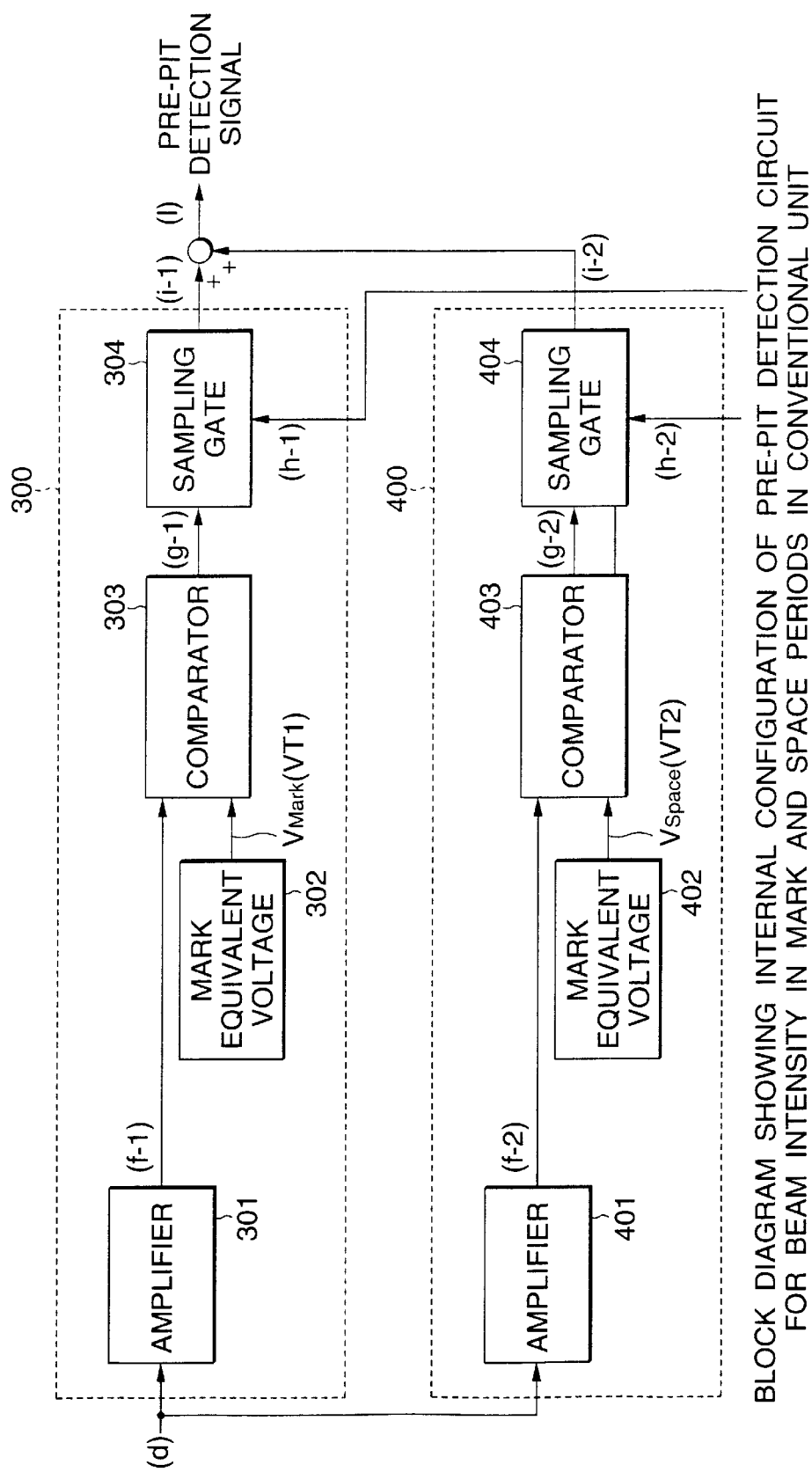
FIG. 13 is a block diagram showing the internal configuration of a pre-pit detection circuit for beam intensity in mark and space periods in the conventional unit.
Figure 14:
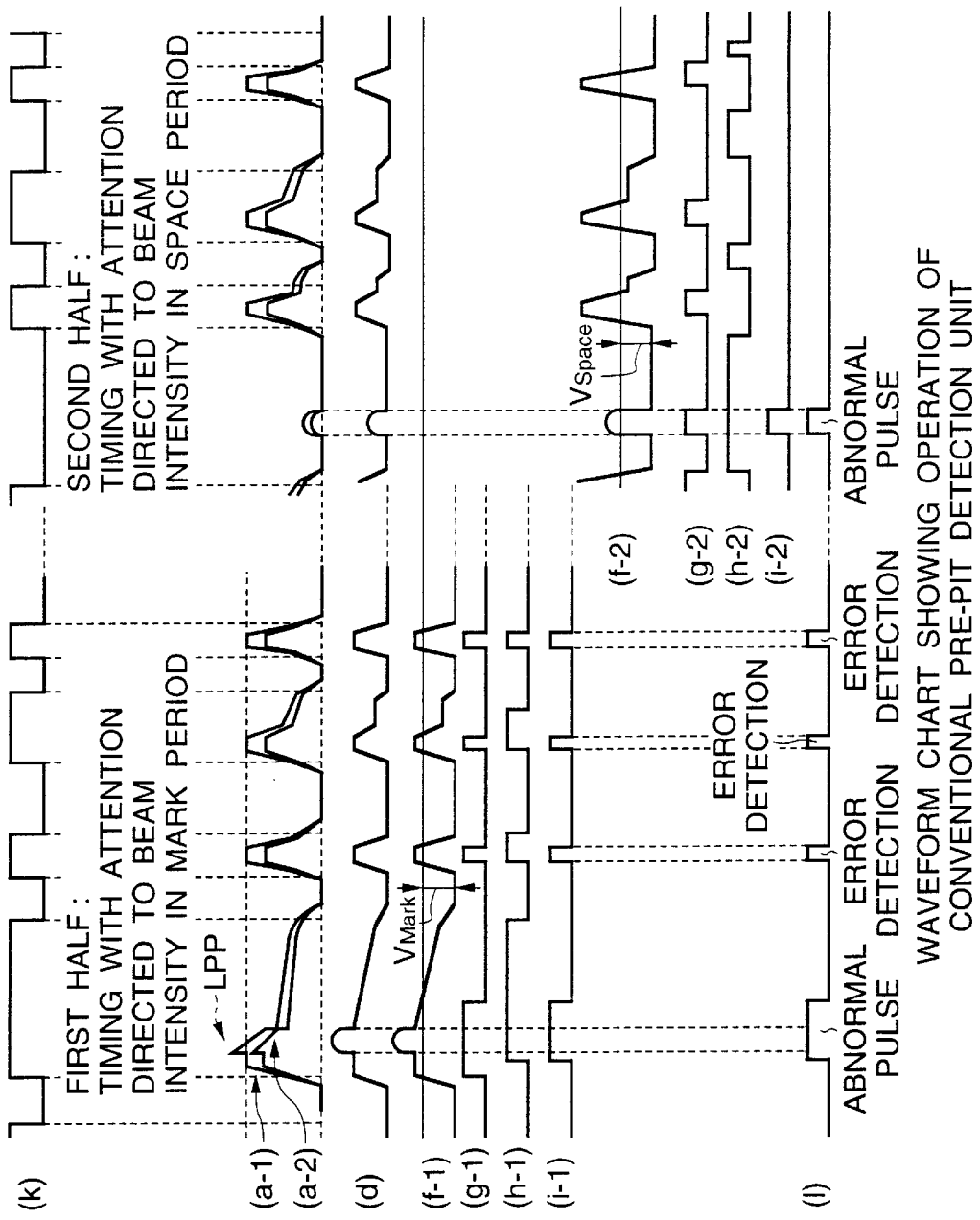
FIG. 14 is a waveform chart showing the operation of the conventional pre-pit detection unit.

More specifically, as shown in FIG. 9A, the amplitude detector 603 includes a first peak hold circuit 603a having a small time constant (high zone) for holding the peak of the output signal (f-1) of the variable gain amplifier 602, an amplitude limiting circuit 603b for removing bad effects such as a defect by limiting the amplitude of the output signal (p-1) of the first peak hold circuit 603a to a predetermined value (SL), and a second peak hold circuit 603c having a large time constant (low zone) for holding the peak of the output signal (q-1) of the amplitude limiting circuit 603b. Similarly, as shown in FIG. 9B, the amplitude detector 703 includes a first peak hold circuit 703a having a small time constant (high zone) for holding the peak of the output signal (f-2) of the variable gain amplifier 702 available through the sampling circuit 710, an amplitude limiting circuit 703b for removing bad effects such as a defect by limiting the amplitude of the output signal (p-1) of the first peak hold circuit 703a to the predetermined value (SL), and a second peak hold circuit 703c having a large time constant (low zone) for holding the peak of the output signal (q-1) of the amplitude limiting circuit 703b. FIG. 10 is a waveform chart showing the output signals of these circuits (603a, 603b, 603c, 703a, 703b and 703c).

A circuit configuration like this is employed for the following reason. As the amplitude detectors 603 and 703 are intended to detect pre-pits, they need to hold an amplitude value equivalent to a pre-pit (which is given in such a form that it is superposed in the maximum amplitude position of the wobbling signal). Therefore, the amplitude detectors 603 and 703 necessitate zones (high zones) great enough to follow pre-pit components, respectively. As described by reference to FIG. 2, on the other hand, the amplitude value thud detected has to be held for a period of at least two sinc frames since the pre-pit is obtainable only in every two sinc frames. As the time constant in the high-zone detector (peak hold circuit) is generally small, the two characteristics (the high zone and the large time constant) demand characteristics that are contrary to each other.

As shown in FIGS. 9A and 9B, according to this embodiment of the invention, the two characteristics contrary to each other are realized by connecting the first peak hold circuits (603a and 703a) having the high zone and low time constant to the second peak hold circuits (603c and 703c) having the low zone and large time constant in series.

In order to prevent the error detection of the maximum amplitude value because of any defect (produced by dust and scratches) on the disk, the amplitude limiting circuits (603b and 703b) for limiting the amplitudes at predetermined slice levels are placed between the first peak hold circuits (603a and 703a) and the second peak hold circuits (603c and 703c). The value of the slice level (SL) is set at a level about 10% greater than the maximum amplitude value of the push-pull signal obtainable in such a state that the pre-pit signal has been superposed on the wobbling signal. By limiting the amplitude like this, the fluctuation of the maximum amplitude value because of the presence of a defect can be restrained, whereby an amplitude value deriving from any defect is prevented from being mistakenly recognized as what is derived from a pre-pit.

As is obvious from the above description, a pre-pit detection unit capable of detecting a pre-pit accurately even though the amplitude level of a radial push-pull signal fluctuates can be provided according to the invention.

The present invention is also utilized as a pre-pit detecting circuit in a reproducing mode, and it is possible to operate the present invention without pre-pit detecting circuit 600 or an OR circuit 106. The gate signal (h-2) is always held to the H-level, then.

What is claimed is:

1. A pre-pit detection unit comprising:
    a push-pull circuit for generating a radial push-pull signal including a pre-data signal according to each of lateral outputs of a light receiving element,
    a first pre-pit detection circuit for beam intensity in a mark period for detecting a pre-pit corresponding to the beam intensity in the mark period according to the radial push-pull signal obtained from said push-pull circuit, and
    a second pre-pit detection circuit for beam intensity in a space period for detecting a pre-pit corresponding to the beam intensity in the space period according to the radial push-pull signal obtained from said push-pull circuit, so that the OR of outputs of both pre-pit detection circuits is outputted as a pre-pit detection signal, wherein
        a first and a second AGC circuits for making the maximum amplitude of said radial push-pull signal obtainable from said push-pull circuit coincide with a reference value are provided in the preceding stages of pre-pit detecting comparators in said first and said second pre-pit detection circuits respectively.

2. The pre-pit detection unit as claimed in claim 1, wherein
    said first pre-pit detection circuit for the beam intensity in the mark period, and said second pre-pit detection circuit for the beam intensity in the space period are provided in parallel on the output side of said push-pull circuit for generating the pre-data signal.

3. The pre-pit detection unit as claimed in claim 1, wherein
    the threshold value of said pre-pit detecting comparator is set according to the reference value.

4. The pre-pit detection unit as claimed in claim 1, further comprising:
    a third and a fourth AGC circuits for making the maximum amplitude of said each of lateral outputs obtained from said light receiving element coincide with the reference value are provided in each input system of a differential operator forming said push-pull circuit for generating the pre-data signal.

5. The pre-pit detection unit as claimed in claim 1, wherein
    said first and said second AGC circuits include;
        a variable gain amplifier for adjusting the amplitude of the radial push-pull signal,
        an amplitude detector for detecting the amplitude of the output signal of said variable gain amplifier, and
        a differential operator circuit for generating a gain control signal for controlling the gain of said variable gain amplifier according to the output value of said amplitude detector and a predetermined reference value, and
        said amplitude detector includes;
            a first peak hold circuit which is positioned at the preceding stage and has a small time constant, and second peak hold circuit which is positioned at the following stage and has a large time constant.

6. The pre-pit detection unit as claimed in claim 5, wherein
    an amplitude limiting circuit is placed between said first and said second peak hold circuits.

7. A pre-pit detection unit comprising:
    a push-pull circuit for generating a radial push-pull signal including a pre-data signal according to each of lateral outputs of a light receiving element, and
    a pre-pit detection circuit for detecting a pre-pit detection signal according to said radial push-pull signal, wherein
    said push-pull circuit includes:
        first and second AGC circuits for making the maximum amplitude of said each of lateral outputs obtained from said light receiving element coincide with a first reference value are provided in each input system of a differential operator forming said push-pull circuit for generating the pre-data signal, and
    said pre-pit detection circuit includes:
        a third ACiC circuit for making the maximum amplitude of said radial push-pull signal coincide with a second reference value,
        a comparator for comparing an output signal of said third AGC circuit with a predetermined threshold value.

8. A pre-pit detection unit comprising:
    a push-pull circuit for generating a radial push-pull signal including a pre-data signal according to each of lateral outputs of a light receiving element, and
    a pre-pit detection circuit for detecting a pre-pit detection signal according to said radial push-pull signal, wherein
    said pre-pit detection circuit includes;
        an AGC circuit for making the maximum amplitude of said radial push-pull signal coincide with a reference value,
        a comparator for comparing an output signal of said AGC circuit with a predetermined threshold value, and
        said AGC circuit includes;
            a variable gain amplifier for adjusting the amplitude of the radial push-pull signal,
            an amplitude detector for detecting the amplitude of the output signal of said variable gain amplifier, and
            a differential operator circuit for generating a gain control signal for controlling the gain of said variable gain amplifier according to the output value of said amplitude detector and a predetermined reference value, and
            said amplitude detector includes;
                a first peak hold circuit which is positioned at the preceding stage and has a small time constant, and
                a second peak hold circuit which is positioned at the following stage and has a large time constant.

9. The pre-pit detection unit as claimed in claim 8, wherein
    an amplitude limiting circuit is placed between said first and said second peak hold circuits.

10. A pre-pit detection method comprising the steps of:
    generating a radial push-pull signal including a pre-data signal according to each of lateral outputs of a light receiving element by a push-pull circuit,
    detecting a pre-pit corresponding to beam intensity in a mark period according to the radial push-pull signal obtained from said push-pull circuit by a first pre-pit detection circuit for the beam intensity in the mark period for, and detecting a pre-pit corresponding to a beam intensity in a space period according to the radial push-pull signal obtained from said push-pull circuit by a second pre-pit detection circuit for the beam intensity in the space period, so that the OR of outputs of both pre-pit detection circuits is outputted as a pre-pit detection signal, and making the maximum amplitude of said radial push-pull signal obtainable from said push-pull circuit coincide with a reference value by a first and a second AGC circuits provided in the preceding stages of pre-pit detecting comparators in said first and said second pre-pit detection circuits respectively.

11. The pre-pit detection method as claimed in claim 10, wherein said first pre-pit detection circuit for the beam intensity in the mark period, and said second pre-pit detection circuit for the beam intensity in the space period are provided in parallel on the output side of said push-pull circuit for generating the pre-data signal.

12. The pre-pit detection method as claimed in claim 10, wherein setting the threshold value of said pre-pit detecting comparator according to the reference value.

13. The pre-pit detection method as claimed in claim 10, further comprising:

making the maximum amplitude of said each of lateral outputs obtained from said light receiving element coincide with the reference value by a third and a fourth AGC circuits provided in each input system of a differential operator forming said push-pull circuit for generating the pre-data signal.

14. The pre-pit detection method as claimed in claim 10, further comprising the steps of:

in said first and said second AGC circuits;

adjusting the amplitude of the radial push-pull signal by a variable gain amplifier, detecting the amplitude of the output signal of said variable gain amplifier by an amplitude detector, and generating a gain control signal for controlling the gain of said variable gain amplifier according to the output value of said amplitude detector and a predetermined reference value by a differential operator circuit, wherein said amplitude detector includes;

a first peak hold circuit which is positioned at the preceding stage and has a small time constant, and a second peak hold circuit which is positioned at the following stage and has a large time constant.

15. The pre-pit detection method as claimed in claim 14, wherein an amplitude limiting circuit is placed between said first and said second peak hold circuits.

16. A pre-pit detection method comprising the steps of:

generating a radial push-pull signal including a pre-data signal according to each of lateral outputs of a light receiving element by a push-pull circuit, detecting a pre-pit detection signal according to said radial push-pull signal by a pre-pit detection circuit, and making the maximum amplitude of said each of lateral outputs obtained from said light receiving element coincide with a first reference value by first and second AGC circuits provided in each input system of a differential operator forming said push-pull circuit for generating the pre-data signal, wherein in said pre-pit detection circuit:

making the maximum amplitude of said radial push-pull signal coincide with a reference value by a third AGC circuit, comparing an output signal of said third AGC circuit with a predetermined threshold value by a comparator.

17. A pre-pit detection method comprising the steps of:

generating a radial push-pull signal including a pre-data signal according to each of lateral outputs of a light receiving element by a push-pull circuit, detecting a pre-pit detection signal according to said radial push-pull signal by a pre-pit detection circuit, wherein in said pre-pit detection circuit;

making the maximum amplitude of said radial push-pull signal coincide with a reference value by an AGC circuit, comparing an output signal of said AGC circuit with a predetermined threshold value by a comparator, and in said AGC circuit;

adjusting the amplitude of the radial push-pull signal by a variable gain amplifier, detecting the amplitude of the output signal of said variable gain amplifier by an amplitude detector, and generating a gain control signal for controlling the gain of said variable gain amplifier according to the output value of said amplitude detector and a predetermined reference value by a differential operator circuit, wherein said amplitude detector includes;

a first peak hold circuit which is positioned at the preceding stage and has a small time constant, and a second peak hold circuit which is positioned at the following stage and has a large time constant.

18. The pre-pit detection method as claimed in claim 17, wherein an amplitude limiting circuit is placed between said first and said second peak hold circuits.

* * * * *